United States Patent [19]
Woonton et al.

[11] 3,796,250
[45] Mar. 12, 1974

[54] APPARATUS FOR MAKING FOUNDRY MOULDS

[75] Inventors: Kent Woonton, Kitchner, Ontario; Jeffrey T. Short, III, Willowdale, Ontario; Don Mills, Willowdale, Ontario; Kenneth N. Roach, Willowdale, Ontario, all of Canada

[73] Assignee: J. R. Short Milling Company, Chicago, Ill.

[22] Filed: June 19, 1973

[21] Appl. No.: 371,532

Related U.S. Application Data

[63] Continuation-in-part of Ser. No. 154,763, June 21, 1971, Pat. No. 3,739,834.

[52] U.S. Cl............... 164/161, 164/210, 164/259
[51] Int. Cl............................................ B22c 15/02
[58] Field of Search ............ 164/12, 17, 18, 27, 37, 164/40, 161, 194, 207, 210, 259

[56] References Cited
UNITED STATES PATENTS
| | | | |
|---|---|---|---|
| 999,308 | 8/1911 | Howard | 164/40 |
| 459,102 | 9/1891 | Adams | 164/40 UX |
| 3,503,436 | 3/1970 | Grolla | 164/194 X |

FOREIGN PATENTS OR APPLICATIONS
| | | | |
|---|---|---|---|
| 603,754 | 8/1960 | Canada | 164/40 |
| 4,417,125 | 7/1969 | Japan | 164/207 |

Primary Examiner—J. Spencer Overholser
Assistant Examiner—John E. Roethel
Attorney, Agent, or Firm—Roylance, Abrams, Berdo & Kaul

[57] ABSTRACT

Apparatus for continuous, high speed production of foundry mould parts by pressing them from a continuous bed of foundry sand mix which is based on a curable binder, pressing of the part being carried out at a time when the mix has adequate plastic flowability for pressure moulding and adequate potential curability to assure a strong, rigid cured product. Advantageous embodiments include curing means operating in conjunction with the pressing means.

10 Claims, 20 Drawing Figures

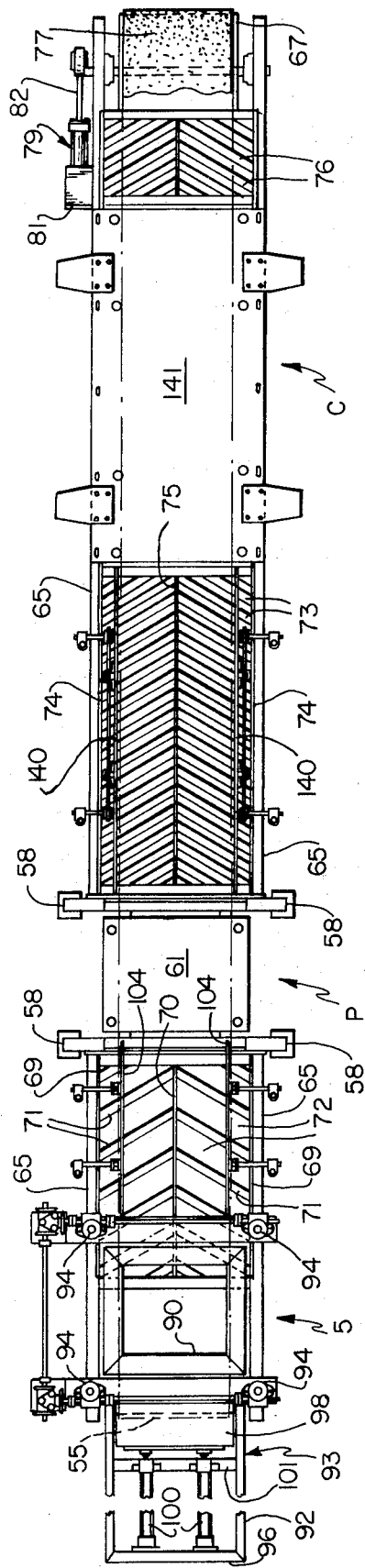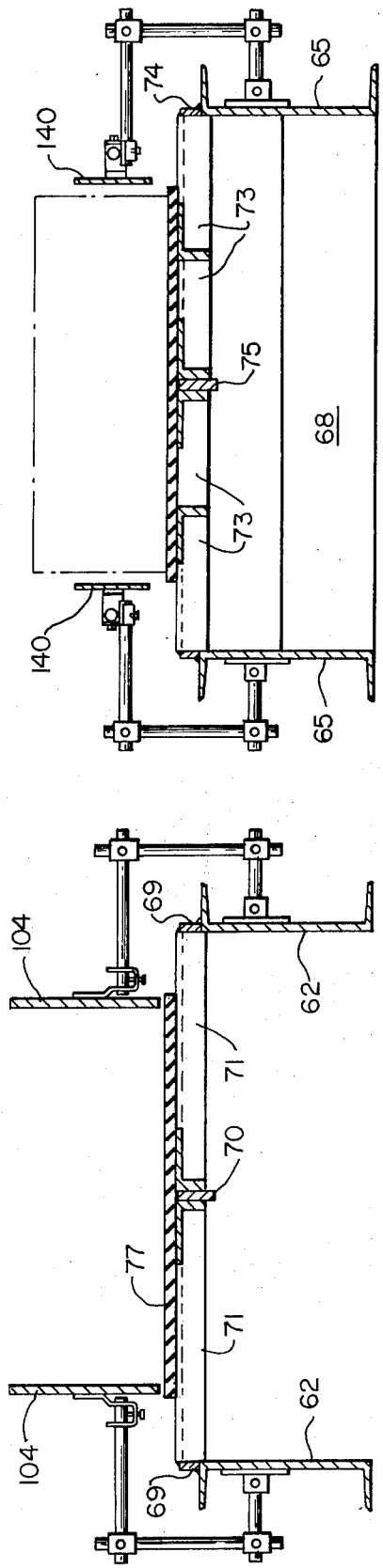

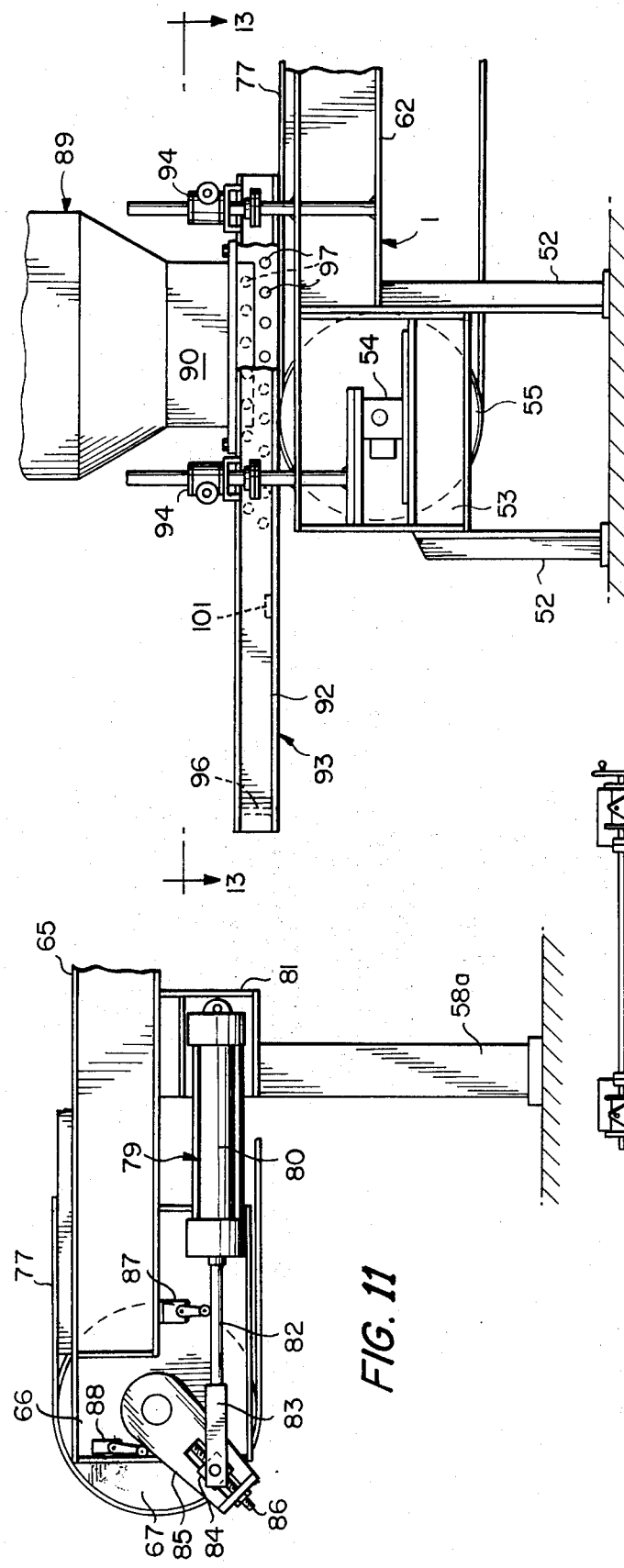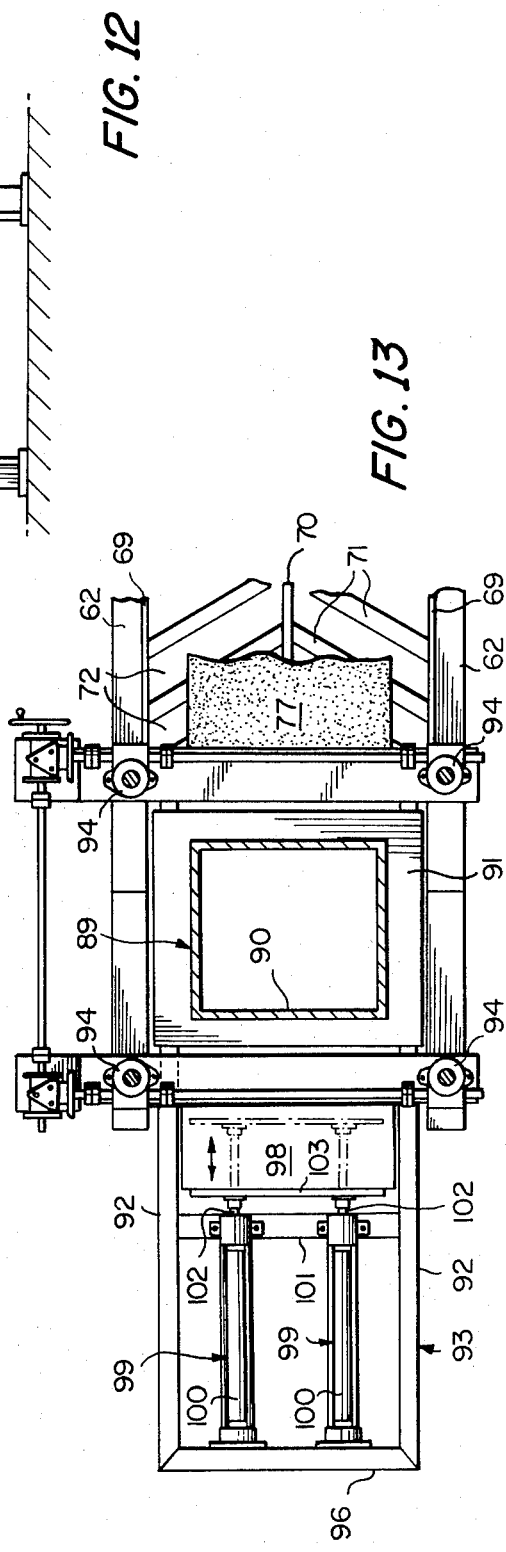

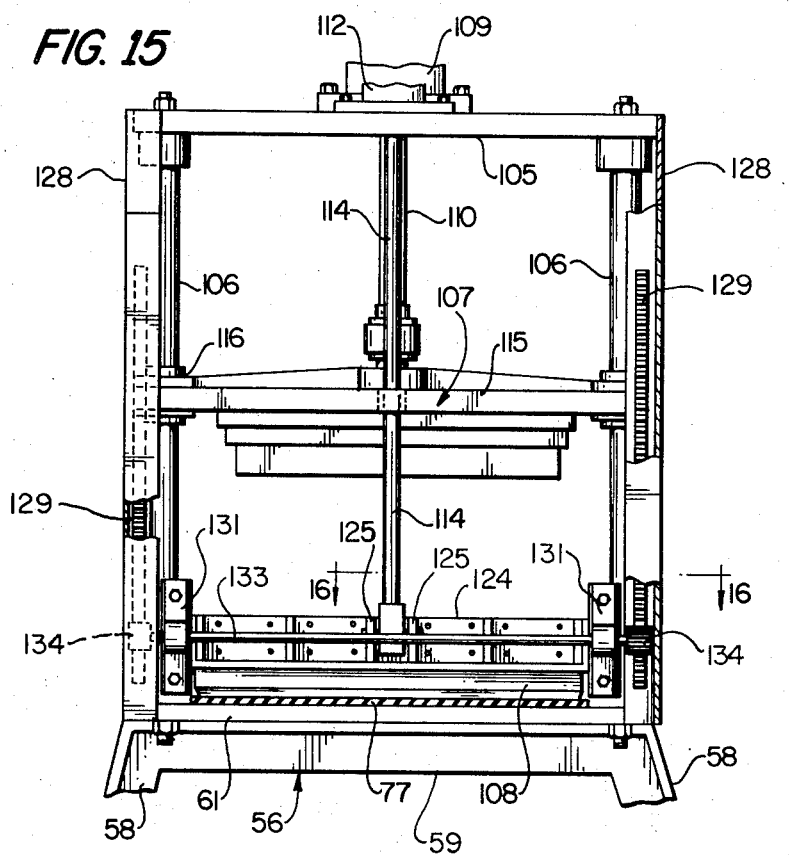
FIG. 15
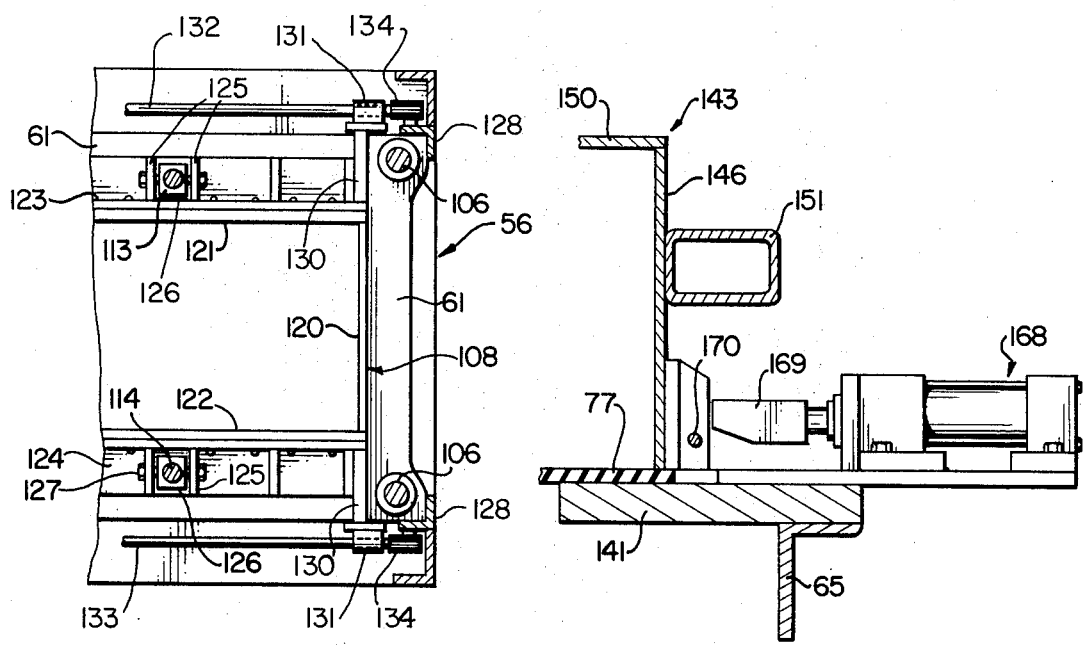
FIG. 16
FIG. 20

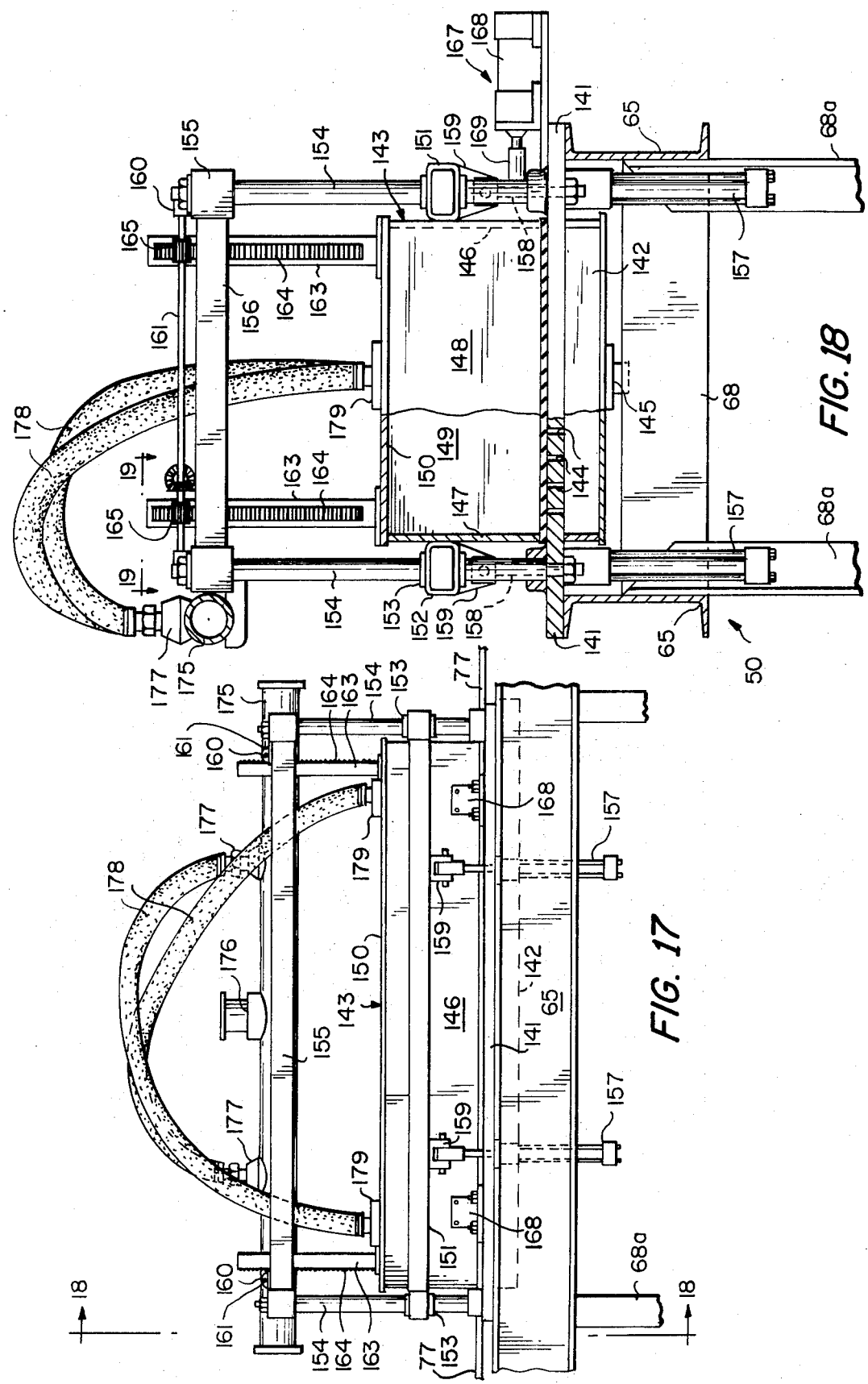

APPARATUS FOR MAKING FOUNDRY MOULDS

RELATED APPLICATION

This application is a continuation-in-part of our co-pending application Ser. No. 154,763, filed June 21, 1971, and now U.S. Pat. No. 3,739,834.

BACKGROUND OF THE INVENTION

In present foundry practice, moulds are made in a number of ways, including the production of green sand moulds and the production of "shell moulds". However, despite long acceptance and continuous refinement, including in recent years various approaches designed to automate such practices, the practices of the prior art have had a number of drawbacks, and these have become more critical in recent years because of the need for improving working conditions in the foundries and the need to make moulds more rapidly with a lower manpower requirement.

Much of the requirement for foundry moulds has here tofore been met by making green sand moulds, following procedures usually requiring use of sea coal and providing a mould which is not cured in the sense that it has adequate strength to allow extensive handling. The use of seal coal has always been objectionable because that material is dirty, contributing a great part, if not the primary part, of the dirt common in foundries today. The weak, uncured nature of green snad moulds has also been a seriously limiting factor, even in the recently developed automatic moulding systems, since such moulds cannot be handled extensively or transported in the usual sense, as by trucks and the like, and the green sand moulds therefore must be made at the location where they are to be used. The practice of using green sand moulds has other disadvantages, including limitations on the dimensional accuracy of the moulds, the need for metal moulding flasks to prevent metal run-out, a relatively high time and labor requirement in mould production, excessive raw material storage requirements, including storage for sea coal, and excessive sand burn-on during casting, with attendant excessive time requirements in the cleaning room.

While shell mould practices offer some advantages, including elimination of sea coal and the production of moulds which are cured and therefore have adeuqate strength to withstand considerable handling, shell moulds have only a relatively limited applicability and cannot be adopted as an extensive replacement for green sand moulds and are subject to the disadvantages of high pattern time and cost and the tendency for the shell mould itself to warp.

The method disclosed in our aforementioned co-pending application provides for high rate, automated production from dry sand formulations of fully cured foundry moulds, avoiding the use of sea coal and other objectionable ingredients, with the cured moulds having greater dimensional accuracy and being sufficiently strong to withstand handling and transportation, the moulds requiring less sand and shorter and easier operations in the cleaning room than is the case with castings from green sand moulds. A general object of the present invention is to provide apparatus for carrying out that method.

Another object is to provide a mould pressing apparatus wherein operation of the apparatus to shape a portion of a bed of sand mix according to a pattern also serves to sever the pressed mould part from the bed of sand mix.

A further object is to devise such an apparatus including means for curing the pressed mould parts.

Still another object is to provide an apparatus capable of shaping and curing mould parts on a continuous, automated, high rate basis.

SUMMARY OF THE INVENTION

Stated broadly, apparatus according to the invention comprise a conveyor extending generally horizontally from a mix depositing station through a mould part pressing station; means at the pressing station for simultaneously pressing an increment of a bed of sand mix on the conveyor into the shape desired for the mould part and severing that increment from the bed of sand mix; and means for driving the conveyor to present a new portion of the bed of sand mix at the pressing station and advance the formed and severed mould part away from the pressing station. In particularly advantageous embodiments, the pressing means operates in conjunction with curing means, the conveyor serving to present a number of the pressed mould parts to the curing means for simultaneous curing treatment each time the pressing means is operated to sever and form a new mould part.

In order that the manner in which the foregoing and other objects are achieved according to the invention can be understood in detail, particularly advantageous embodiments thereof will be described with reference to the accompanying drawings, which form a part of the original disclosure hereof, and wherein:

FIG. 8 is a top plan elevational view of the apparatus of FIG. 7, with parts removed for clarity of illustration.

Figure 7:
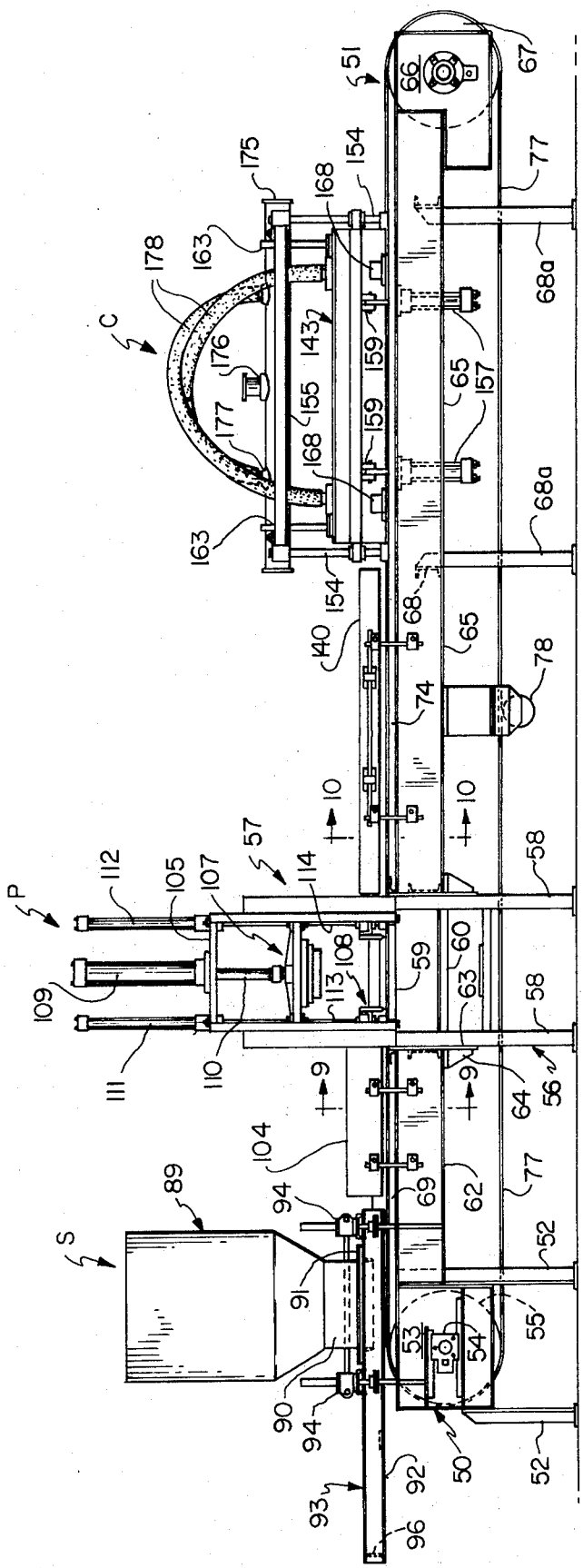
FIG. 7 is a side elevational view of an apparatus generally in accord with FIG. 4.
Figure 14:
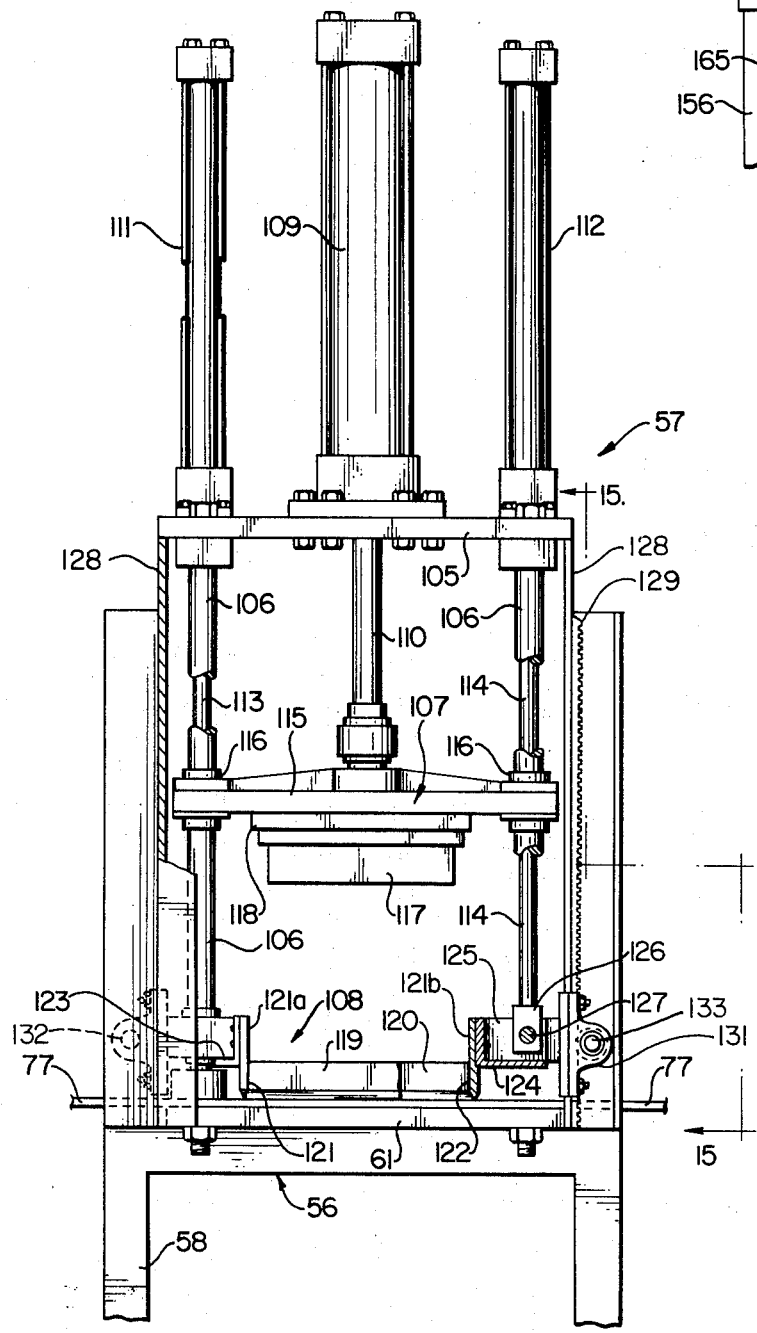

FIGS. 9 and 10 are enlarged transverse sectional views taken respectively on lines 9—9 and 10—10, FIG. 7;

FIG. 11 is a fragmentary side elevational view illustrating the drive mechanism for the conveyor forming part of the apparatus of FIG. 7;

FIG. 12 is a side elevational view of a feed hopper and related mechanism employed in the apparatus of FIG. 7;

FIG. 13 is a horizontal sectional view taken on line 13—13, FIG. 12;

FIG. 14 is an enlarged side elevational view, with parts broken away for clarity of illustration, of the forming press employed in the apparatus of FIG. 7;

FIG. 15 is a view, mainly in side elevation, taken generally on line 15—15, FIG. 14

Figure 19:
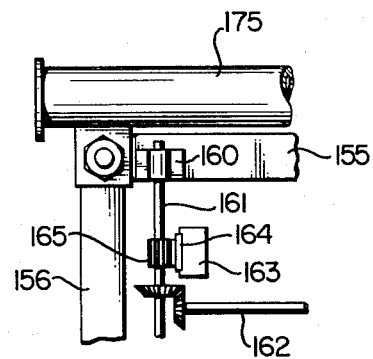

FIG. 16 is a fragmentary horizontal sectional view taken generally on line 16—16, FIG. 15;

FIG. 17 is a side elevational view of curing apparatus forming part of the apparatus of FIG. 7;

FIG. 18 is a transverse sectional view taken on line 18—18, FIG. 17;

FIG. 19 is a fragmentary plan elevational view taken on line 19—19, FIG. 18; and FIG. 20 is an enlarged fragmentary side elevational view of a lock-down mechanism embodied in the apparatus of FIGS. 17-19.

THE METHOD CARRIED OUT BY THE APPARATUS

Apparatus according to the invention first establishes on a conveyor a bed of a mix including dry sand and a curable binder, advances the bed to a pressing station, forces a pattern into the bed while the bed is supported so as to press the mix into the shape desired for the cope or drag of the mould, and at the same time separate the pressed mould part (cope or drag) from the uncompressed mix, then advances the mould part to a curing station where the part is cured to provide adequate rigidity for handling. The mix employed is of such plastic nature as to be mouldable by pressing under acceptable conditions of pressure and time, and is also characterized by curability after being shaped by the pressing operation. Support of the bed of mouldable sand mix is typically accomplished by a conveyor belt, with a supporting element backing up the belt at the forming station, and with the shaping press and belt operated at speeds to give, e.g., a production rate of up to 20 mould parts per minute.

The initial composition or sand mix must be mouldable under conditions of reasonable pressure and time, and must retain this characteristic for a period of time adequate to allow the mix to be prepared, the bed to be formed, and the bed to be advanced to the pressing station. Mouldability can be characterized as requiring both plastic flowability, so that the mix will respond to the pressing operation, and early toughness or tenacity, to assure that the pressed part will retain its shape as an integral body with precise dimensions and surfaces. In addition, the mix must be capable of being cured under reasonable conditions of time, e.g., preferably not exceeding 15 min. and in all events not more than 60 min., and temperature, e.g., from room temperature to 600°F. It is also necessary that the binder material employed be of such nature that the cured binder material will be destroyed or burned out during casting of metal in the mould, and that the entire mix be of such nature that evolution of nitrogen and hydrogen be minimized when the mould is in contact with the liquid metal during casting.

A wide variety of binder materials can be employed, including the alkali metal silicate binders, the curable polymeric materials, core oil binders, and mixed binder systems, e.g., systems comprising both a curable polymer and a core oil, and systems comprising both a silicate and a polymeric material. Certain binder materials are especially advantageous because they provide both excellent characteristics for pressing of the mould part and economy as to cost of materials and cost of curing. Thus, formulations employing an alkali metal silicate, particularly sodium silicate, offer special advantages, as do formulations employing as the binder material a composition comprising both an isocyanate and an oil-modified alkyd resin.

Formulation of the initial mix can be based on a binder material which cures by a catalyzed reaction, in which case suitable proportions of a catalyst or catalysts are included in the mix or subsequently introduced, or on binder materials cured solely by application of heat or by gassing the pressed mould part with a gaseous curing agent or agents. In all instances, the formulation is such that, at the time pressing is to be accomplished, the mix has adequate plastic flowability to be pressed to shape, an adequate inter-particle plastic adhesion to assure that the shape imparted during pressing will be retained precisely, and enough residual cure capability to assure that, after final curing, the mould part will have adequate strength for handling and adequate hot strength for casting. Accordingly, in any application of the apparatus, the time preiod between completion of mixing and presentation of the bed or layer at the pressing station must be selected, in view of the cure rate which characterizes the binder material employed, so that, at the time the mould part is pressed, progressive curing will not have proceeded so far as to create a relatively rigid inter-particle bond which would be disrupted by the pressing step and then could not be re-established by further curing of the binder material.

Curable polymeric materials useful according to the invention are the thermoset resins, including the phenolic resins, the urea-furan resins, the water soluble modified resorcinol resins, furfuryl alcohol-formaldehyde resins, and the isocyanate resin systems including, in addition to the isocyanate, a hydroxyl-containing coreactant, e.g., a hydroxyl-containing drying oil. Polymeric materials based on an aromatic polyisocyanate, an oil-modified alkyd resin and a suitable catalyst or catalysts are particularly effective. Such materials are described, for example, in U. S. Pat. Nos. 3,255,500, issued June 14, 1965, to James J. Engel and Vernon L. Guyer, and 3,426,831, issued Feb. 11, 1969, to Janis Robins and Robert J. Schafer.

Suitable alkali metal silicate binder materials are those based on aqueous solutions or dispersions containing at least 10 percent by weight of the alkali metal silicate and having a silica to alkali metal oxide weight ratio in the range of 0.5:1 — 5:1. Sodium silicate solutions in which the $SiO_2:Na_2O$ weight ratio is 1:1 — 3.5:1 are particularly useful. The alkali metal silicate content of the aqueous material can be as high as 65% by weight, with contents of at least 30 percent by weight being particularly effective. Mixes based on alkali metal silicate binder materials can be cured by evaporation of water, by application of heat, by gassing with an acid gas such as $CO_2$, or by including in the binder material a curing catalyst such as an aqueous acid solution or a latent acid catalyst, e.g., a glycerol mono-, di-, or tri-actetate. Conventional additives can be included, such as the organosilicones or alumina employed to improve collapsibility or shake-out characteristics; the alkali metal siliconates and like agents used to improve resistance to moisture; and kerosene, for both lubricating and improving moisture resistance.

With all binder materials according to the invention, it is desirable to minimize the amount of binder in order to reduce the raw materials cost. One way in which this is advantageously accomplished is by use of an inexpensive compatible extender for the primary binder material. Particularly useful extenders for the polymeric binders are the so-called CTLA hydrocarbon polymer oils, prepared generally as described in U. S. Pat. No. 2,861,966, issued Nov. 25, 1958, to Joseph L. Betts and John P. Thorn. Such polymer oils have a Staudinger molecular weight of 200–1000, an iodine number of 240–320, and a boiling point in the range of 400–1,000°F. Also useful as extenders are other core oils prepared by combining polymerized unsaturated hydrocarbons and, e.g., a drying oil.

When the binder employed is one which does not in itself provide adequate early toughness, additional additive materials are employed for this purpose. Such materials include cereal products, e.g., maize (corn) flours and such flours which have been partially dextrinized; wood flour; fire clay; china clay; bentonite; fine sand; bank sand; silica flour; and iron oxide.

In selecting formulations for use according to the invention, care must be taken to assure that the sand mix will retain its mouldability for a period of time adequate to accomplish the manipulative steps necessary to press the mould part and, particularly, to assure that curing of the binder does not progress so far, before pressing is done, that the inter-particle bond will be defeated by the pressing step. One way to determine suitablity of a sand mix for use according to the invention is to measure the change in density of standard rammed test specimens over that period of time required for mixing the materials, delivering the mix and forming the bed, presenting the bed at the pressing station, and carrying out pressing. That time period will of course vary, depending upon, e.g., apparatus details. Assuming the use of continuous mixing apparatus for production of the sand mix, and an endless belt apparatus on which the bed is formed and which advances the bed to the pressing station, typical time periods from start of mixing to completion of pressing can be on the order of 2–20 mins., and for illustrative purposes can be taken as 10 mins. In testing sand mixes for suitability, cylindrical specimens 2 inches long and 2 inches in diameter, rammed 3 times with a 14 lb. weight, according to AFS Standard Foundry Sand Mixture Test Specimen, pages 4—4 through 4–11 of the *Foundry Sand Handbook*, 7th Ed., 1963, published by the American Foundrymen's Society, can be employed. Density comparisons are made between a specimen from a first sample, rammed immediately after mixing is completed, and a specimen prepared from a second sample, rammed at a given time (e.g., 6 min., when the mixing time is 4 min., to give the 10 min. test period) after mixing is completed. A density variation between the two specimens not exceeding 6 percent, and advantageously not exceeding 4 percent, for most compositions employing a polymeric binder material or an alkali metal slicate binder material, and 14 percent for oil sand mixes, indicates that the composition is suitable according to the invention.

When progressively curable polymeric binder materials are employed, suitability according to the foregoing test procedure can be achieved with proportions of binder material ranging up to 10 percent of the weight of sand employed. Particularly satisfactory results are obtained with binder materials comprising both an amount of a polyisocyanate-oil modified alkyd resin combination equal to 0.5–1 percent of the sand weight and an amount of CTLA hydrocarbon polymer oil correspondingly equal to 0.5–0 percent of the sand weight.

When an aqueous alkali metal silicate binder material is employed, suitability according to the foregoing test procedure can be achieved with proportions of the binder material equal to 2–4 percent of the weight of the sand in the mix.

THE EMBODIMENT OF FIGS. 1–3

Figure 1:
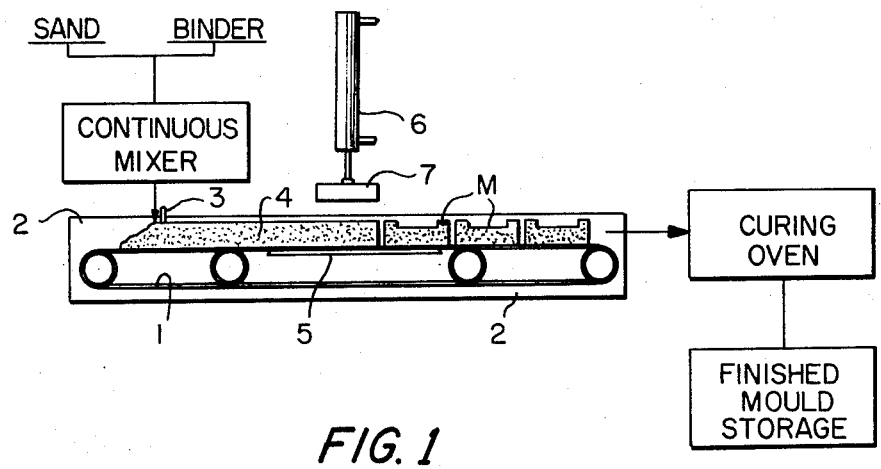
FIG. 1 is a semi-diagrammatic illustration of apparatus according to one embodiment.

Referring to FIG. 1, the ingredients for the sand mix are supplied to a suitable continuous mixing apparatus and the mix so formed is discharged onto an endless horizontal conveyor belt 1 which is driven stepwise to move the upper run of the belt to the right, as viewed. Parallel side plates 2 are provided, one extending along each side of the belt, in such fashion that the upper run of the belt and the side plates cooperate to form a trough effective to retain the sand mix. A horizontal scraper 3 extends between the side plates and is spaced above the upper run of the belt 1 to form the sand mix into a continuous bed 4 of predetermined depth as the upper run of the belt advances.

In a location spaced from scraper 3 in the direction of movement of the upper run of the belt, a flat stationary back-up plate 5 is rigidly mounted beneath the upper run of the conveyor in a position such that the conveyor belt slides smoothly over the back-up plate in flush contact therewith. In this location, there is mounted above the conveyor a vertically acting rectilinear power device, such as a conventional pressure operated motor 6 of the piston and cylinder type. A die, indicated generally at 7 and described hereinafter in detail, is rigidly mounted on the end of the piston rod 8 of motor 6. Operation of motor 6 to drive the piston downwardly is effective to move die 7 downwardly, from an initial position spaced above the level of bed 4, until the die has pressed the increment of bed 4 therebelow into the shape of the desired mould part and has severed the mould part from the trailing portion of the bed.

Operation of conveyor 1 is carried out in timed relation to cyclic operation of motor 6 so that, when die 7 is in its raised position, the conveyor presents a fresh increment of bed 4 and, while pressing is carried out, the belt and therefore the bed are stationary. Once a mould part has been pressed and the die withdrawn upwardly, the next cycle of movement of conveyor 1 carries the shaped mould part away from the pressing station, the mould parts ultimately being delivered to a continuously operated curing oven.

Figure 2:
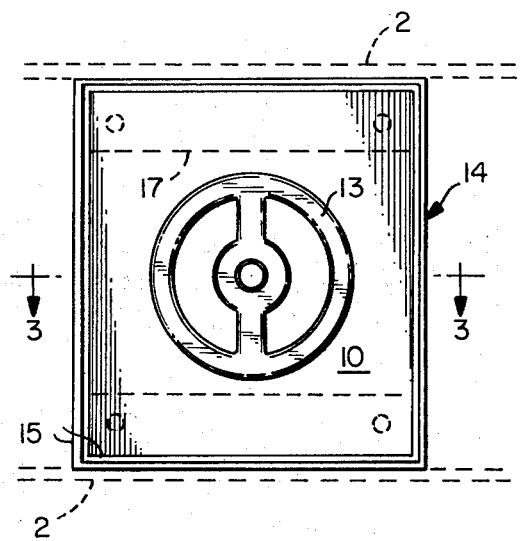
FIG. 2 is a bottom plan view of a pressing die employed in the apparatus of FIG. 1.
Figure 3:
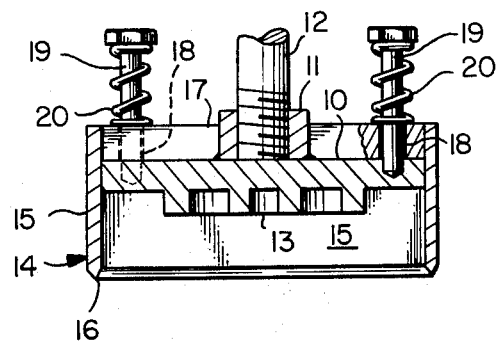
FIG. 3 is a sectional view taken generally on line 3—3, FIG. 2.

An imporatant feature of the invention is that the pressing operation is carried out in such fashion that each stroke of the pressing die, cooperating with the conveyor belt and back-up plate, forms the corresponding portion of bed 4 into a complete mould part, by what is in essence a pressure moulding action, and also severs that mould part from the trailing bed. To accomplish this, a die having the construction seen in FIGS. 2 and 3 is employed. The die comprises a die plate 10 having a flat upper face to the center of which is welded an internally threaded bushing 11 for rigid connection of the die plate to the piston rod 12. The opposite face of the die plate presents the male pattern 13 to be pressed into the sand mix bed 4.

The plan shape of plate 10 is rectangular and the die plate is slidably embraced by a rectangular confining and severing shroud 14. Shroud 14 comprises four flat side members 15 welded together in rectangular fashion, the inner face of each member 15 being in flush slidable engagement with a different one of the edges of plate 10. Side members 15 lie in vertical planes and the bottom edge of each side member is formed as a knife edge, at 16. Welded to the upper portions of two opposite side members 15, so as to be above the die plate, are two bars 17 each provided near its respective ends with two plain upright bores 18, so that there is one bore 18 near each corner of the assembly. Bores 18 freely accommodate, respectively, four screws 19, the threaded ends of which are engaged in upwardly opening bores in die plate 10. Compression springs 20 are provided, each surrounding a different one of screws 19 and engaged between the head of the screw and the upper face of the corresponding bar 17.

When the die is raised out of engagement with bed 4, springs 20 urge screws 19, and therefore die plate 10, upwardly so that the upper face of the die plate engates the lower faces of bars 17. The pattern 13 is therefore spaced a significant distance above the lower cutting edges 16 of side members 15. When the die is driven downwardly into bed 4, the side members 15 are forced completely through the bed, stopping only when engaged with the portion of belt 1 supported by plate 5. Movement of the piston rod downwardly still continues, so that die plate 10 is forced against the bed 4 with pattern 13 creating the desired moulded impression. Such downward movement of the combination of the piston rod can be limited by a stop or stops (not shown) provided on the piston rod or on screws 19. When the piston rod again moves upwardly to withdraw the die to its inactive position, the mould part M is left on belt 1, completely severed from the bed 4, the cavity portion, sides and top of the mould part being completely pressure formed by the action of the die.

Considering FIG. 2, it will be seen that two opposite side members 15 of the die lie in vertical planes which extend along the inner faces of the respective side plates 2 of the apparatus, so that these sides of the die are essentially in sliding contact with side plates 2 when the die engages bed 4. Thus, for practical purposes, once the shroud 14 is forced downwardly into contact with belt 1, shroud 14 cooperates with belt 1 and die plate 10 to completely confine substantially the entire increment of bed 1 disposed at the forming station. The action at the forming station thus comprises severing that increment from the trailing portion of the bed, confining the severed increment of the bed, and then completing the pressing operation by further movement of the die plate, with upward withdrawal of the die then leaving the shaped mould part as an independent article ready to be moved away from the pressing location by the next step of movement of the conveyor belt.

Excellent results are obtained with most mix formulations according to the invention when the forming operation is carried out with a die plate pressure, that is, the pressure applied to the sand mix bed 4 by plate 10, on the order of 30 p.s.i., with pressures in the range of 10-100 p.s.i., being useful.

It will be understood that springs 30 can be replaced by individual fluid pressure operated power devices.

In this embodiment, conveyor 1 is arranged to deliver the formed mould parts M directly to a conventional curing oven of any suitable type.

THE EMBODIMENTS OF FIGS. 4-6

The embodiment shown in FIG. 4 comprises a conveyor having an endless belt 21, the conveyor being driven to cause the upper run of the belt to move step-by-step along a horizontal path which passes first beneath a surge hopper and under a horizontal leveling scraper 23, thence through a pressing station where the die 27 and driving motor 26 are located, and then through a curing station embodying a stationary vacuum box 30, located below the upper run of the conveyor belt, and a vertically movable curing box 31 which is located above the upper run of the conveyor belt.

The surge hopper and scraper 23 coact to form a continuous bed 24 of the sand mix, the bed being of predetermined depth. Die 27 is constructed in the fashion earlier described with reference to FIGS. 2 and 3 and, therefore, has an effective length $l$, i.e., the dimension lengthwise of the belt between the two cutting edges 16, FIG. 3, of the walls of the severing shroud 14, FIG. 3, which are transverse with respect to the belt. Belt 21 is driven in equal steps, with each step equal to the length $l$. Movable curing box 31 is of elongated rectangular plan configuration and has an open side directed toward the belt, the open side being defined by side walls 32 and end walls 33 and 34, the latter extending transversely relative to the upper run of the belt. End wall 32 is spaced from the adjacent wall of shroud 14, FIG. 3, by a distance $(l)(x)$, with $x$ being equal to one in the embodiment shown in FIG. 4. The space between end walls 33 and 34 is $(l)(y)$, with $y$ being equal to 3 in the embodiment shown in FIG. 4.

Vacuum box 30 has a flat top wall 35 over which the upper run of conveyor belt 21 slides, wall 35 being provided with a plurality of spaced perforations (not shown). Curing box 31 is arranged above the upper run of conveyor belt 21 for vertical movement toward and away from the belt. Box 31 is driven by a vertically acting fluid pressure operated rectilinear power device 36 of the piston and cylinder type. Power devices 26 and 36 are conventionally arranged for simultaneous operation under the control of a sequencing control 37, so that the curing box 31 is driven downwardly into engagement with the upper run of belt 21 simultaneously with each downward pressing stroke of die 27 and is raised above the path of travel of the pressed mould parts M simultaneously with each upward movement of die 27. Each pressing stroke of die 27 forms and severs from bed 4 one mould part M, that mould part being carried toward curing box 31 by the next step of movement of the conveyor belt, which movement occurs during the succeeding upstroke of the die. After two mould parts M have been formed and severed by two successive pressing strokes of die 27, the next upstroke of the die (with curing box 31 moving upwardly simultaneously with the die) will be accompanied by advance of the two mould parts by one distance $l$, bringing the first mould part M just beyond the vertical plane occupied by end wall 33. Accordingly, when the next pressing stroke of the die occurs, and curing box 31 is lowered to bring the lower edges of walls 32-34 into engagement with the upper run of the conveyor belt, curing box 31 will enclose the first mould part M. As the next two pressing strokes occur, that mould part will be advanced through two more steps and will therefore be adjacent end wall 34 of the curing box when, during the second of those two pressing strokes, the curing box is lowered to engage the conveyor belt. At this point, three of the mould parts M are enclosed by the curing box, one of those for the first time, the next for the second time, and the third for the third time. Thereafter, each time the curing box descends as die 27 forms and severs a new mould part, there will be three mould parts within the confines of the curing box.

The interior of curing box 31 is connected via conduit 38 to one port of a conventional fast-acting power operated multi-way valve 39, another port of the valve being connected via conduit 40 to a vacuum chamber 41 evacuated by vacuum pump 42, and still another port of the valve being connected via conduit 43 to a source 44 of carbon dioxide under pressure. The interior of vacuum box 30 is connected via conduit 45 and check valve 46 to conduit 38, with check valve 46 oriented to allow flow only from the interior of vacuum box 30 to conduit 38. Valve 39 is so arranged as to be operable through a sequence in which (a) conduit 38 is first connected to conduit 40, and hence to the vacuum chamber, while conduit 43 is sealed off; (b) conduit 38 is then connected to conduit 43, and hence to carbon dioxide source 44, while conduit 40 is sealed off; (c) conduit 38 is then vented to the atmosphere, with conduits 40 and 43 both sealed off; and (d) all of conduits 38, 40 and 43 are sealed preparatory to repeating the sequence. Automatic sequencing control system 37 is constructed and arranged to accomplish simultaneous operation of power devices 26 and 36 and to cause valve 39 to operate through the sequence just described in response to lowering of curing box 31 into sealed engagement with the upper run of the conveyor belt. Thus, when the curing box engages the conveyor belt, valve 39 connects conduit 38 to vacuum chamber 41, and the curing box is evacuated. Since check valve 46 allows fluid flow from vacuum box 30, that box is evacuated simultaneously with evacuation of curing box 31. This step of the sequence is accomplished in a time which is short in comparison to the total time during which the curing box engages the conveyor belt, and the purpose of this step is to evacuate the curing box and the mould parts M enclosed thereby, and to evacuate box 30 so that there will not be a significant pressure differential across the thickness of the conveyor belt and the portion of the belt under the curing box will therefore not tend to be drawn into the curing box.

The next step in the sequence of operation of valve 39 then occurs, causing carbon dioxide gas to fill the curing box 31 and to fill the interstices of the mould parts M, with the result that the aqueous sodium binder content of each mould part is completely cured throughout the mould part and the mould part thus rigidified. Valve 39 remains in its second step position for a major portion of the total time period during which the curing box engages the conveyor belt.

Just before the upstroke of power device 36 occurs to raise curing box 31 from its mould-part-confining position, valve 39 is operated through the third step of its sequence, connecting the interior of the curing box to the atmosphere via conduit 38 so that the pressurized carbon dioxide within the curing box is vented and there will be no significant outrush of gas at the conveyor belt as the curing box is disengaged from the belt. Finally, valve 39 is operated to its fourth, or fully closed position, as curing box 31 is raised to the upper limit of its travel.

Advantageously, the surge hopper 47 is equipped with a sliding gate 48 actuated by a power device 49 from full closed to full open position, the power device 49 being controlled to open gate 46 each time a pressing cycle occurs.

Figure 4:
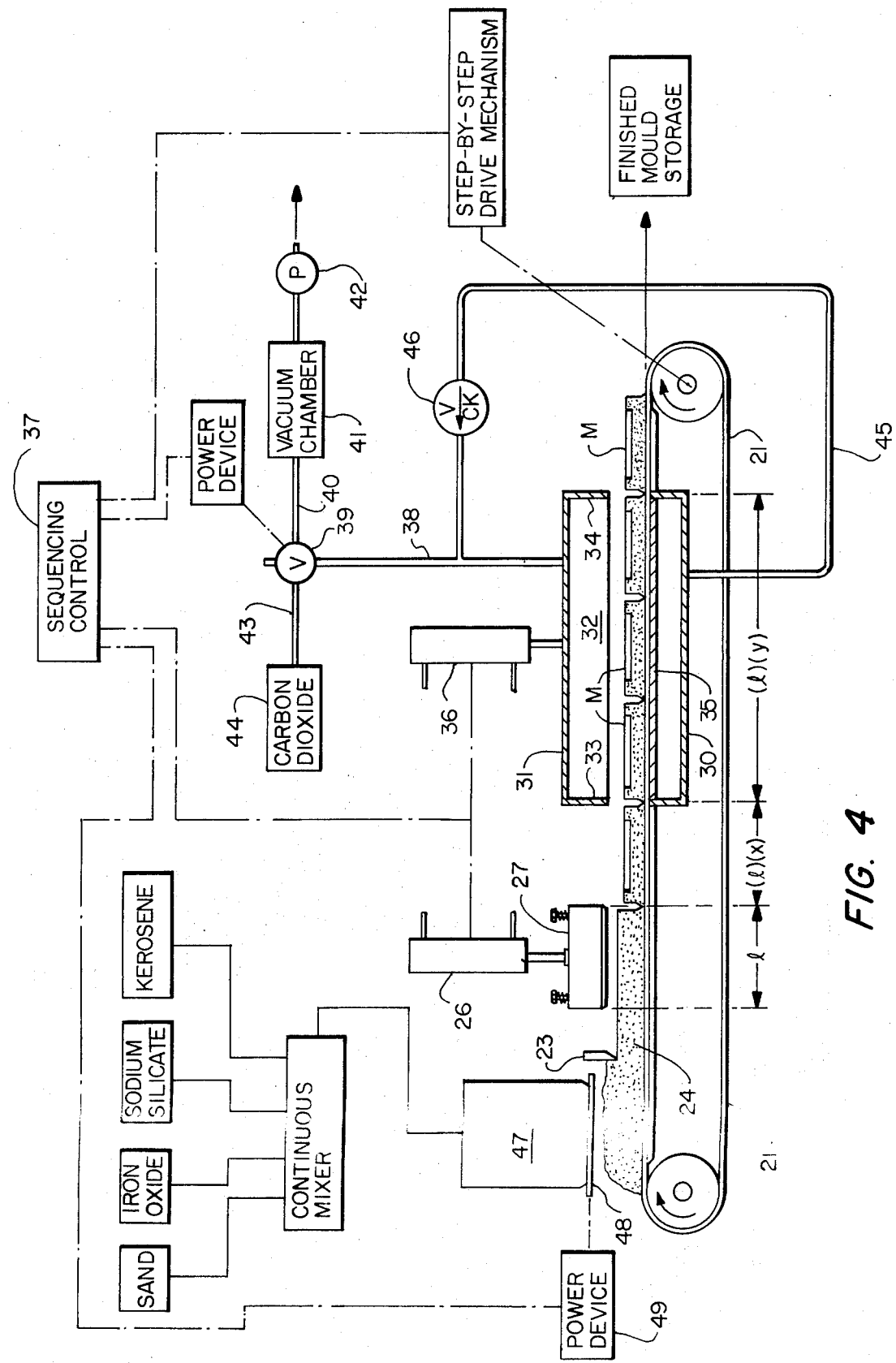
FIG. 4 is a semi-diagrammatic illustration of apparatus according to another embodiment.
Figure 5:
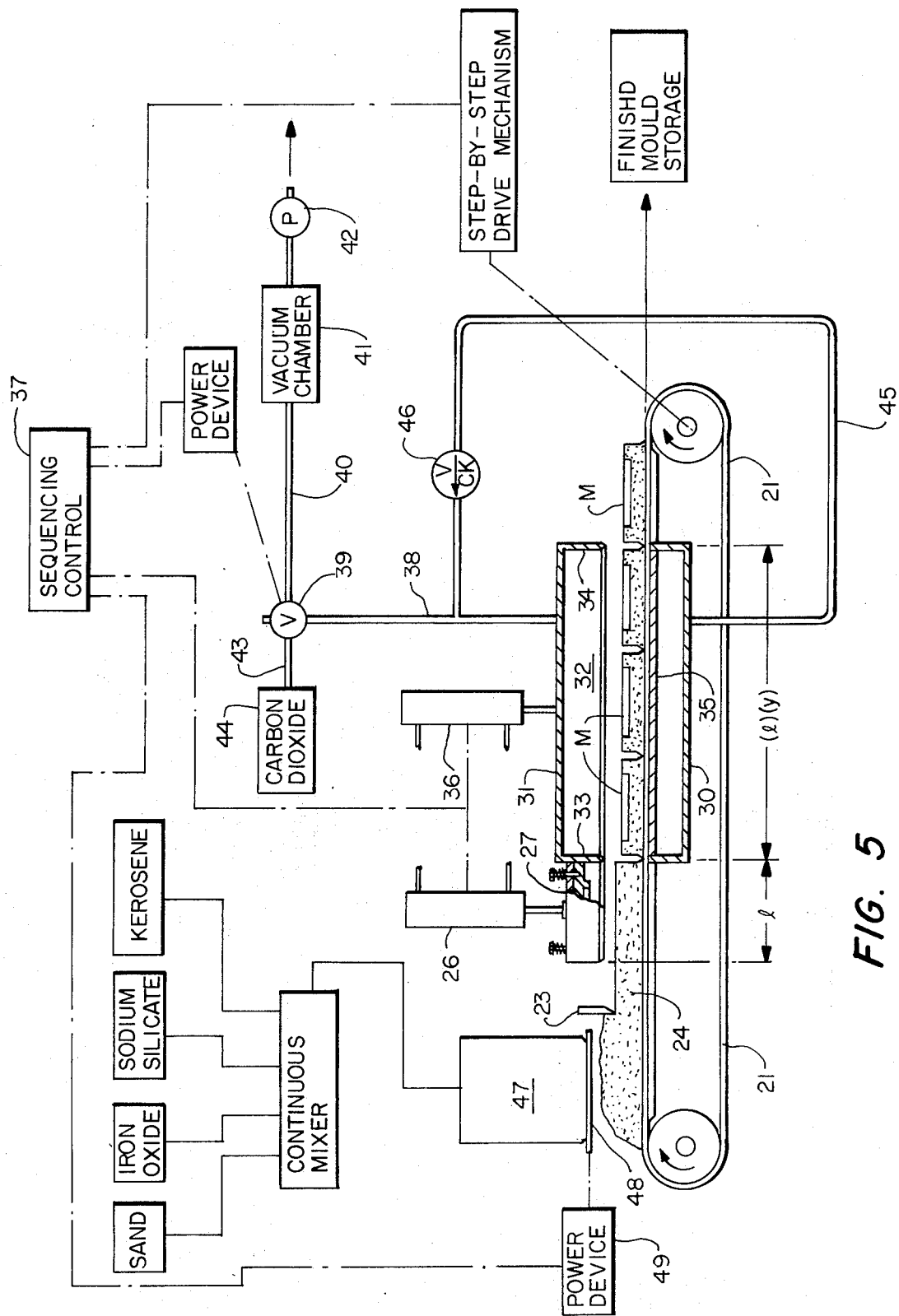
FIG. 5 is a semi-diagrammatic view illustrating a modified form of the apparatus of FIG. 4.

FIG. 5 illustrates a modified form of the apparatus of FIG. 4 wherein the curing box 31 is mechanically joined with the forming die 27. Here, transverse wall 15a is common to both the shroud 14 of the forming die and the curing box, so that the space (l) (x), FIG. 4, between the forming die and the curing box is eliminated.

Figure 6:
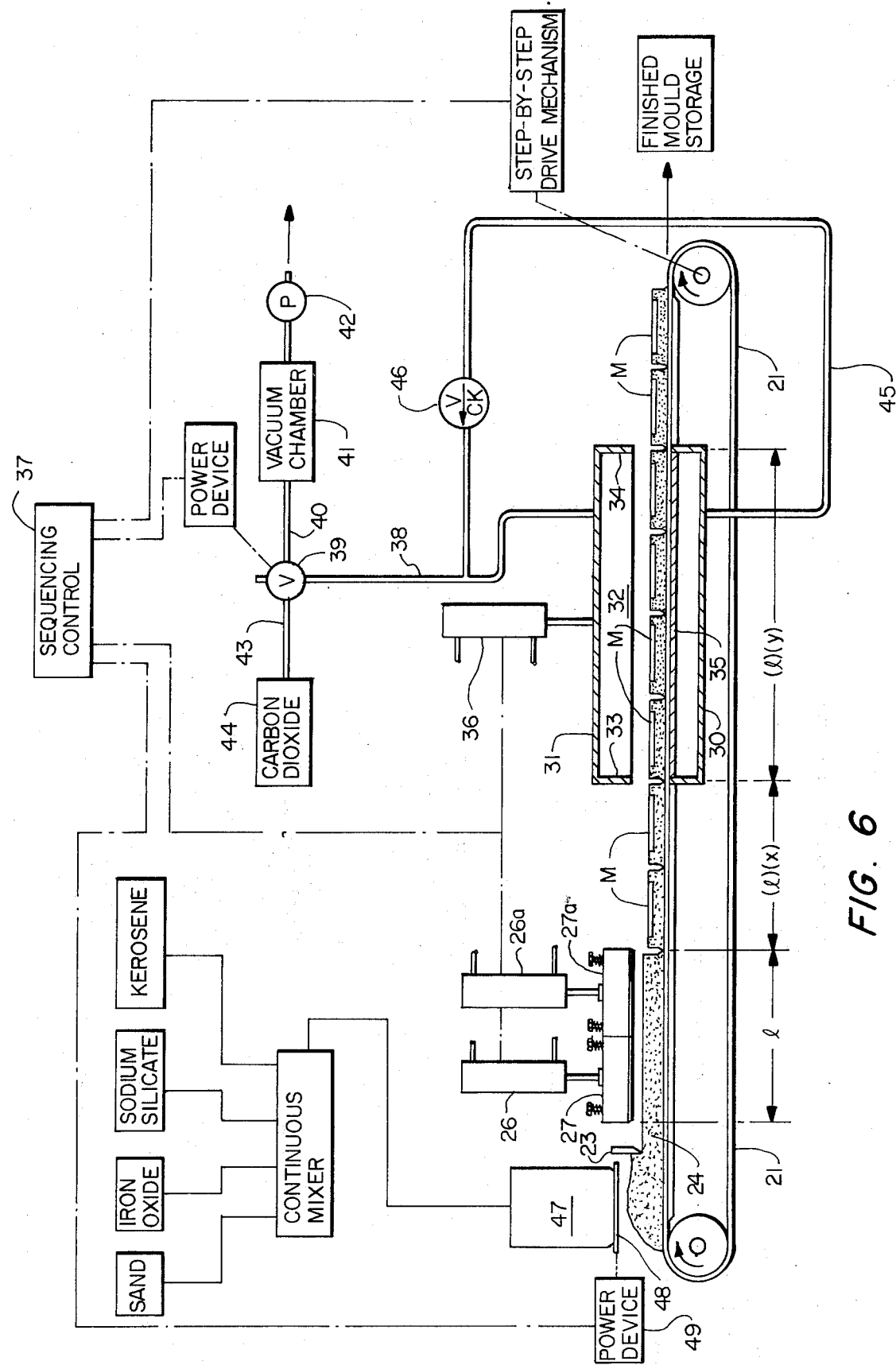
FIG. 6 is a semi-diagrammatic view of an apparatus similar to that of FIG. 4 but adapted for simultaneous production of both the cope and drag for a complete mould.

Another embodiment, illustrated in FIG. 6, provides for simultaneous production of both the cope and the drag for a complete mould. Here, the apparatus includes an additional press unit, comprising power device 26a and die 27b, located downstream of and immediately adjacent to the power device 26 and die 27. Under control of the sequencing control device 37 the two press units are operated concurrently, so that die 27a forms and severs an additional mould part each time a mould part is formed and severed by die 27. Die 27 can be equipped with a pattern suitable for the cope, and die 27a can be equipped with a pattern suitable for the drag. The two patterns have the same dimension lengthwise of the conveyor, and the conveyor is driven stepwise with the length l of each step equal twice the effective length of one pattern. In this embodiment, the curing box has a length (l) (y), where y equals two, so that the curing box encloses four mould parts each time the box engages the belt during a pressing operation. Box 31 is spaced from die 27a by a distance (l) (x), where x equals one. Accordingly, during continuous operation of the apparatus, there are always two mould parts on the portion of the conveyor between die 27a and curing box 31, and these two parts include a cope M, formed and severed by die 27, and a drag M', formed and severed at the same time by die 27a.

THE EMBODIMENT OF FIGS. 7–20

FIGS. 7–20 illustrate in more detail a particularly advantageous embodiment of the apparatus having the general configuration hereinbefore described with reference to FIG. 4. The apparatus comprisies an elongated horizontal frame 50 which supports an endless belt conveyor 51 and can be considered as defining a sand mix supply station S, at the infeed end of the conveyor, a forming station P, located downstream from the supply station, and a curing station C, located between the forming station and the discharge end of the conveyor.

FRAME STRUCTURE

Frame 50 includes four floor-mounted uprights 52 to which the side plates 53 are secured to support the take-up blocks 54 for the tail pulley or roller 55 of conveyor 51. At station S, the frame includes an upright floor-mounted base, indicated generally at 56, for the press 57, base 56 comprising four legs 58 disposed so that each leg defines one corner of the square plan of the base, the tops of the legs being interconnected by horizontal members 59, and additional sets of horizontal brace members 60 being provided therebelow. A rigid pressure pad, in the form of a square metal plate 61 of substantial thickness, is fixed to the top of base 56, as by being attached directly to members 59 by screws.

Two longitudinal side beams 62 interconnect the respective adjacent pairs of uprights 52 and legs 58, one end of each beam 62 being supported directly on the corresponding upright 52, the other end of each beam being supported by a transverse plate 63. Beams 62 are of U-shaped transverse cross-section, arranged with the base of the U vertical and the webs which form the legs of the U projecting outwardly away from the base, the two beams being identical and the upper webs thereof lying in a common horizontal plane which is slightly below the horizontal top surface of pressure pad 61. Downstream of forming section P, frame 50 comprises two side beams 65 which extend between and are secured to the appropriate pair of legs 58 of the press base 56 and the side plates 66 in which the head pulley or roller 67 of conveyor 51 is journalled, beams 65 being interconnected by transverse members 68 and supported by two pairs of legs 69.

Frame 50 includes means supported by beams 62 and 65, and coating with pressure pad 61 and a pressure pad, later described, at the curing station, for providing rigid support beneath and through essentially the entire extent of the upper run of the endless belt 68 of conveyor 51. As will be clear from FIGS. 8 and 9, a side strip 69 is welded to and extends longitudinally along the top of each beam 62, and a longitudinal center strip 70, secured at its respective ends to plate 63 and an appropriate transverse member at side plates 53, extends for essentially the full distance from the tail pulley to the press. A plurality of support bars 71, of L-shaped transverse cross-section, are arranged in "herringbone" fashion and secured to side strips 69 and center strip 70. Thus, bars 71 are arranged in pairs, with the bar of each pair converging inwardly and toward forming station P, the outer end of each bar being welded to the corresponding side strip 69 and the inner end to center strip 70. Each bar 71 has one web of its "L" horizontal, with the other web of the "L" depending therefrom, the upper faces of the horizontal webs of all of the bars lying in the horizontal plane occupied by the upper face of pressure pad 61. As seen in FIG. 8, the bars 71 are spaced apart lengthwise of the apparatus so that, while the horizontal webs of bars 71 coact to provide a rigid horizontal support over which the conveyor belt can slide, spaces 72 are provided for escape of sand, etc., which would otherwise collect and impair operation of the conveyor.

Between forming station P and curing station C, support for the upper run of the conveyor belt is provided by a plurality of bars 73, FIGS. 8 and 10, secured to side strips 74 and center strip 75 in the general fashion just described with reference to bars 71, the arrangement being the same as for bars 71 save that the spaces between bars 73 are distinctly smaller than the spaces between bars 71. Support bars 76, FIG. 8, are provided in the space between curing station C and head pulley 67 in the same fashion just described with reference to bars 73. The upper faces of the horizontal webs of all of the bars 73, 76 lie in a common plane coincident with the upper faces of pressure pad 61 and the pressure pad of the curing station.

CONVEYOR AND CONVEYOR DRIVE

Conveyor 50 includes an endless flexible impervious belt 77 which extends around tail pulley 55 and head pulley 67 under tension, the horizontal upper run of the belt extending from the tail pulley into immediate sliding engagement with the horizontal webs of support bars 71, then over pressure pad 61, then over the horizontal surfaces of support bars 73, thence across the pressure pad at curing station C, and over the horizontal surfaces of support bars 76 to head pulley 67. A supporting idler roller 78 is engaged beneath the lower run of the conveyor belt at its midpoint, roller 78 being suitably suspended from beams 65.

The conveyor is driven in stepwise fashion by a rectilinear power device 79, FIG. 11, which can be of conventional hydraulic piston-and-cylinder type. The blind end of cylinder 80 of power device 79 is pivotally connected to a mounting bracket 81 secured to the frame, the pivotal axis being parallel to and below the axis of rotation of head pulley 67. Piston rod 82 of the power device 79 projects toward the location of the head pulley and is pivotally connected by a clevis 83 to a nut 84 which is secured to crank arm 85 by an adjusting screw 86 extending lengthwise of the arm, so that the screw and nut coact as a means for adjusting the effective length of the crank arm. Crank arm 84 is connected to drive head pulley 67 through a conventional one-way clutch (not shown) so oriented that when piston rod 82 is retracted, swinging crank arm 85 counterclockwise (as viewed in FIG. 11), an increment of counterclockwise movement of head pulley results. No movement is imparted to the head pulley when, as piston rod 82 is extended, crank arm 85 is swung in a clockwise direction. The increment of rotation imparted to the head pulley by each cycle of operation of power device 79 drives conveyor belt 77 to cause the upper run of the belt to advance one step from the tail pulley toward the head pulley, the length of the step being the same for each cycle of operation of power device 79 and being predetermined by adjustment of screw 86. Completion of each increment of rotation of the head pulley, and thus of each step of movement of the conveyor belt, is detected by a position switch 87 operated by crank arm 85. Stationary condition of the conveyor belt is sensed by a position switch 88 operated by crank arm 85. Switches 87, 88 provide controlling inputs to the sequencing control device, e.g., device 37, FIG. 4, in conventional fashion.

MEANS FOR ESTABLISHING BED OF SAND MIX ON CONVEYOR 51

Adjacent tail pulley 55, the apparatus includes a hopper indicated generally at 89 and to which the sand mix is supplied from a conventional continuous mixer (not shown). Hopper 89 includes a discharge throat 90 of rectangular transverse cross-section, throat 90 being equipped with mounting flanges 91, FIG. 12, which project across and are bolted to side beams 92 of a horizontal supporting frame 93. Frame 93 is located above tail pulley 55 and the adjacent portion of the horizontal upper run of conveyor belt 77, and is mounted on frame 50 by four conventional vertical jacking devices 94 which are operative to support the hopper with the terminal edges of the walls of throat 90 lying in a horizontal plane spaced a predetermined distance above the upper run of the conveyor belt.

The side beams 92 of frame 93 are interconnected at one end by a cross member 96. Each beam 95 carries two series of rollers 97, the rollers being mounted at the inner sides of the beams to rotate about parallel axes which extend across the line of travel of the conveyor belt, the two series of rollers being spaced apart vertically to accommodate a flat horizontal gate 98 of rectangular plan form, the rollers of one series engaging the upper face of the gate at one edge thereof while the rollers of the other series engage the opposite face of the gate at the same edge. Two rectilinear power devices 99, typically of the hydraulic piston-and-cylinder type, are mounted on frame 93, the cylinders 100 thereof being rigidly secured to cross-beam 96 and an additional transverse member 101, and the piston rods 102 extending mutually parallel and parallel to the line of travel of the conveyor belt, toward gate 98. The free ends of rods 102 are secured to a flange 103 fixed to the edge of the gate which is nearer the power devices 99. The arrangement is such that operation of the power devices to project piston rods 102 moves gate 98 to a position closing throat 90 of the hopper, and retraction of the piston rods withdraws the gate to allow sand mix to flow by gravity onto the upper run of the conveyor belt.

As the conveyor belt is moved, the edge of the side wall of throat 90 which is nearer forming station P acts as a scraper to level the bed of sand mix in the same manner as does levelling scraper 3, FIG. 1. Between hopper 89 and forming station P, side beams 62 support adjustable side plates 104 which define the respective edges of the sand mix bed carried by the upper run of the conveyor belt.

FORMING PRESS 57

Press 57 comprises a heavy support plate 105 rigidly mounted on pressure pad 61 by four elongated vertical posts 106 which also serve as guides for the die plate 107 and the shearing shroud 108. The bottom ends of posts 106 are shouldered against and extend downwardly through openings in the respective corners of pressure pad 61 and are secured by nuts at the bottom face of the pressure pad. A main, heavy duty hydraulic cylinder 109 is mounted on plate 105 at the center of the plate and projects thereabove, the piston rod 110 for cylinder 109 passing downwardly through a central opening in plate 105 and being rigidly secured to the center of die plate 107. Spaced each on a different side of cylinder 109 and lying in the same plane as the longitudinal center line of conveyor 51 are two smaller hydraulic cylinders 111 and 112, these cylinders also being rigidly secured to and projecting upwardly from plate 105. The piston rods 113 and 114 for cylinders 111 and 112, respectively, extend downwardly through appropriate openings in plate 105, each piston rod 113, 114 extending along a vertical line midway between a different pair of the posts 106. Piston rods 113, 114 pass freely through appropriate openings in die plate 107 and the lower ends of the piston rods are secured to shearing shroud 108 as later described.

Die plate 107 comprises a main rectangular body plate 115 provided at each corner with a cylindrical slide bearing 116 which embraces one of the posts 106. The male pattern 117 for the mould part is detachably mounted on plate 115 by a mounting plate 118 in any of the suitable manners well known in the stamping press art.

Shearing shroud 108 is made up of four flat side plates secured rigidly together to form an open rectangle, the conveyor 119 and 120 extending lengthwise of the conveyor 51 in the completed apparatus, and plates 121 and 122 extending transversely of the conveyor, the dimensions of the plates being such that the shroud can slidably embrace mounting plate 118. In thie regard, gears, inner faces of plates 119–122 are smooth, flat and uninterrupted. In the completed apparatus, the lower edges of all of plates 119–122 lie in a common horizontal plane, and these edges are formed as blunt knife edges to reduce resistance as the shroud is forced downwardly into the bed of sand mix. Plates 121, 122 are of greater vertical dimension than are plates 119, 120 so that plates 121, 122 project above the upper edges of plates 119, 120 for a substantial distance to present flange portions 121a and 122a, respectively. Mounting members 123 and 124 are secured to the outer faces of flange portions 121a and 122a, respectively, each mounting member being of L-shaped transverse cross-section and arranged with one web of the L overlying the respective flange portion and the other web of the L projecting horizontally therefrom. Two vertical plates 125 are welded to the central portion of each member 123, 124 and are spaced apart to accommodate a pivot block 126 fixed to the lower end of the corresponding piston rod 113, 114. For each piston rod 113, 114 a pivot pin 127 extends through the plates 125 and block 126 to secure the shroud 108 to the piston rods 113, 114.

As best seen by comparing FIGS. 15 and 16, four additional members 128 are secured to and extend vertically between the corresponding corners of pressure pad 61 and support plate 105. Members 128 are of L-shaped transverse cross-section and, as shown in FIG. 16, embrace the respective corners of pad 61 and plate 105. For the two of members 128 nearer tail pulley 55, one web of the L of each member is transverse to the conveyor and faces the tail pulley. For the other two of members 128, the webs of the L which are transverse to the conveyor face head pulley 67. A rack bar 129, FIGS. 14 and 15, is welded to such transverse web of each member 128, the rack bars being vertical and their teeth facing lengthwise of the conveyor. At each of its ends, each member 123, 124 has secured thereto a bracket 130, FIG. 16, on which is mounted a pillow block 131. The pair of pillow blocks 131 carried by member 123 rotatably support a horizontal shaft 132 which extends transversely of the conveyor. A shaft 133 is similarly carried by the pillow blocks 131 mounted on member 124. Each end of each shaft 132, 133 has fixed thereto a pinion 134, FIGS. 15 and 16, the pinions 134 being operatively meshed with the respective rack bars 129. With shroud 108 and support members 123, 124 constituting a rigid assembly, the combination of shafts 132, 133 and their pinions 134 coact with rack bars 129 to assure that the common plane of the bottom, knife-like edges of plates 119–122 of the shroud is maintained horizontal as the shroud is actuated by the power devices 111 and 112.

The sequencing control device employed with the apparatus, e.g., control device 37, FIG. 4, causes the press 57 to complete one cycle each time conveyor belt 77 has been advanced by one step. During each cycle of the press, power devices 111, 112 are first operated to drive the shearing shroud 108 downwardly until, as seen in FIGS. 14 and 15, the shroud engages the upper run of the conveyor belt 77 and forces the same against the support afforded by pressure pad 61. Such movement of shroud 108 causes plate 121 thereof to shear completely through the bed of sand mix, and a predetermined quantity of the sand mix is thus confined by the coacting shroud and conveyor belt. When the shroud engages the conveyor belt 77, power device 109 is operated to drive die plate 107 downwardly a predetermined distance adequate to cause pattern 117 to compress the confined body of sand mix into the shape desired for the mould part. With die plate 107 remaining in its lowered position, still in pressure engagement with the now-shaped mould part, power devices 111, 112 are then operated to raise shroud 108 to the limit of its upward travel, so that the shroud is spaced well above the surface of the bed of sand mix carried by the conveyor Power device 109 is then operated to raise die plate 107 to its upper most position, leaving the shaped mould part in place on belt 77. The next step through which belt 77 is driven conveys the mould part away from the press and brings a new portion of the bed of sand mix into position for the next cycle of operation of the press.

STRUCTURE AT CURING STATION C

The mould parts formed by press 57 are advanced by conveyor belt 77 toward station C, adjustable side plates 140 being mounted on side beams 65 to assure that the mould parts remain centered on the belt. At station C, the apparatus includes a heavy flat rectangular plate 141, FIG. 17, which extends across and is secured to the upper edges of side beams 65 to serve as the top of a fixed vacuum box 142 and as the pressure pad to oppose the downward force applied to the upper run of the conveyor belt by a vertically movable curing box 143.

Vacuum box 142 is a simple rectangular structure formed from flat side and end plates which are welded to and depend from plate 141, and a flat bottom plate welded to the bottom edges of the side and end plates. Plate 141 is provided with a plurality of perforations 144, FIG. 17, which extend compeltely through the plate and communicate with the interior of the vacuum box, the entire perforated area of plate 141 being covered by the upper run of the conveyor belt. A fitting 145 is provided on the bottom wall to connect the interior of the vacuum box to an evacuated chamber and vacuum pump in the manner earlier described with reference to FIG. 4.

Curing box 143 comprises rectangular side plates 146 and 147, rectangular end plates 148 and 149, and a rectangular top plate 150, all welded together to define a chamber which is open at the bottom, has a width slightly less than that of conveyor belt 77, and is elongated lengthwise of the conveyor. A longitudinal side beam 151 extends along the outer surface of plate 146 and is welded thereto. A beam 152 is similarly secured to plate 147. The ends of beams 151, 152 project beyond the respective end plates 148, 149 and are each provided with a slide bearing 153, the bearings 153 each slidably embracing a different one of four vertical guide posts 154 which are each rigidly secured to and extend upwardly from a different corner portion of plate 141. Posts 154 are of equal height and are rigidly interconnected at their upper ends by longitudinal members 155 and transverse members 156.

Four hydraulic cylinders 157 are mounted on and depend vertically from plate 141, the plate being provided with openings through which the piston rods 158 for the cylinders project upwardly. The upper ends of piston rods 158 carry pivot blocks connected to clevises 159 secured to the lower edges of beams 151 and 152. The longitudinal members 155 carry two pairs of pillow blocks 160 with the pillow blocks of each pair being aligned transversely across the structure to rotatably support two shafts 161. A third shaft 162 extends lengthwise of the curing box between shafts 161, being carried by bearings supported on one of the members 155. Each shaft 161 is equipped with a bevel gear, and bevel gears are fixed to the ends of the shaft 162 to mesh with those on shafts 161 so that shafts 161 must rotate in unison. Four vertical posts 163 are secured to and project upwardly from top plate 150 of curing box 143, two of posts 163 being near one of the shafts 161 and the other two posts being near the other shaft 161. Each post 163 carries a vertical rack bar 164 so disposed that its teeth face the corresponding shaft 161. Each shaft 161 carries two pinions 165 and each pinion 165 is meshed with one of the rack bars 164.

Curing box 143 is a rigid unit disposed with the bottom edges of its side and end plates lying in a common plane. Guide posts 154, slide bearings 153 and beams 151, 152 support the curing box for vertical movement between an upper position, in which the box is spaced above the upper run of belt 77 by a distance adequate to allow free passage of the mould parts as the belt advances, and a lower position, in which the lower edges of the side and end plates of the box engage the upper run of theconveyor belt and the latter is, in effect, a bottom wall for the box. Hydraulic cylinders 157 are operable to drive the curing box between its two extreme positions, selectively in both directions. The combination of shafts 161, 162 and their respective bevel hears, pinions 165 and rack bars 164 assures that precise horizontal disposition of the curing box 143 will be maintained throughout its upward and downward movement.

Four lock-down devices 167 are provided to urge the bottom edges of the side and end plates of the curing box into fluid-tight sealing engagement with the upper run of the conveyor belt when the curing box is in its lowermost position. Each device 167 includes a horizontal hydraulic cylinder 168 mounted on plate 141 and arranged to move its piston rod toward and away form the curing box. The piston rod for each cylinder 168 is equipped with a cam block 169 having a lower face which slants upwardly and away from the hydraulic cylinder. In appropriate positions each operatively disposed with respect to a different one of cylinders 168, four horizontal pins 170 are mounted on the outer sides of side plates 146 and 147, the arrangement being such that simultaneous operation of the cylinders 168 causes the cam blocks 169 to ride up ahd over the respective pins 170, forcing the curing box downwardly so that the edges of plates 146–149 indent the conveyor belt in sealing fashion, with that condition being preserved until cylinders 168 are operated to retract the piston rods.

A header pipe 175 extends beside and is mounted on one of the longitudinal members 155. Header 175 has a central fitting 176, to be connected to a pipe which can be placed in communication selectively with an evacuated chamber and a source of compressed carbon dioxide gas, as earlier described with reference to FIG. 4. Header 175 also has two fittings 177, spaced equally from fitting 176, which are each connected to a different one of two flexible hoses 178. Two fittings 179 are provided on top plate 150 of the curing box, each of hoses 178 being connected to a different one of fittings 179 to place header 175 in communication with the interior of the curing box. Fitting 145 of vacuum box 142 can be connected via suitable piping (not shown) to header 175, a check valve being provided as earlier described with reference to FIG. 4 to allow the header to communicate with the vacuum box only in an evacuating mode.

Plate 141 and curing box 143 are so located relative to press 57 and operation of cylinders 157 is so timed relative to stepwise movement of conveyor belt 77 that, when the apparatus is in full operation, the end plates 148, 149 of the curing box will enter the spaces between adjacent mould parts each time the curing box is lowered. It will be apparent that the fluid circuit and the valving sequence described with reference to FIG. 4 can be employed to accomplish evacuation, carbon dioxide curing, and venting during each cycle of operation of press 57, all as earlier described, and that evacuation of box 142 simultaneously with evacuation of the curing box 143 will assure that the upper run of the conveyor belt will remain flat against plate 141 during the evacuating step.

What is claimed is:

1. In an apparatus for high speed production of foundry mould parts from a curable sand mix having adequate plastic flowability for pressure moulding, the combination of an endless horizontal conveyor extending from a mix depositing station to a forming station;

means at the mix despositing station for depositing the sand mix on the conveyor and forming the deposited mix into a bed of predetermined depth;

means connected to said conveyor to drive the same stepwise to advance the bed of sand mix from the depositing station to the forming station in steps of equal length;

a press unit located at the forming station and comprising a flat support operatively arranged with respect to said conveyor to rigidly support against downward movement the portion of the bed of sand mix presented at the forming station by stepwise advance of the conveyor, a pattern carrier, a bed severing device, and vertically acting power means connected to said pattern carrier and said bed severing device to drive the same downwardly toward said flat support and to return the same upwardly to positions adequately spaced above said conveyor to allow unimpeded movement of said bed of sand mix at the forming station, said bed severing device including a portion which extends transversely of the conveyor in a position to sever from the trailing portion of the bed a portion of the bed adequate for the mould part to be formed, said power means being capable of operation, in response to completion of a step of movement of the bed by said conveyor, to drive said severing device downwardly into engagement with the conveyor and to drive said pattern carrier downwardly to press the severed portion of the sand mix into the shape determined by a pattern carried by said pattern carrier.

2. The combination according to claim 1, wherein said pattern carrier is of rectangular plan configuration and is so arranged that two sides thereof are transverse to said conveyor; and said bed severing device comprises four severing elements arranged to define a hollow rectangle of such size and configuration that said pattern carrier, and the pattern carried thereby, can move vertically within and independently of said bed severing device.

3. The combination according to claim 2, wherein said power means is a single power device connected to drive said pattern carrier; and said bed severing device is mounted on said pattern carrier by means including a yieldable connection operative to allow said pattern carrier to continue its downward movement after said bed shearing device has engaged said conveyor.

4. The combination according to claim 2, wherein said power means comprises a first power device connected to said pattern carrier, and power means, in addition to said first power device, connected to said bed severing device, said pattern carrier and said bed severing device being mounted for vertical movement independently of each other.

5. The combination defined in claim 4, wherein said additional power means includes two power devices each connected to a different one of two mutually parallel ones of said severing elements.

6. The combination defined in claim 1, wherein said conveyor extends beyond said forming station, each step of operation of said conveyor being effective to remove from the forming station the mould part formed by the preceding cycle of operation of said press as well as to advance the leading end portion of the sand mix bed into operative position at the forming station.

7. The combination defined in claim 6, wherein said conveyor comprises an endless belt, the horizontal upper run of which extends from the forming station through a curing station, the combination further including a flat support member located at the curing station and over which the upper run of the conveyor belt extends;

means located above said conveyor at the curing station and defining a curing chamber, said means comprising, a rigid top wall, two rigid mutually parallel side walls, and two rigid mutually parallel end walls, said side walls being spaced apart by a distance smaller than the width of the conveyor belt, said end walls being spaced apart by a distance equal to a multiple of the length of each step of advance of the conveyor, the lower edges of said side and end walls defining an open bottom for said curing chamber;

means mounting said curing chamber for vertical movement between a raised position, in which the lower edges of said side and end walls are spaced above the conveyor to allow free passage of mould parts through the curing station, and a lower position, in which the lower edges of said plates engage said conveyor belt in fluid-tight sealing fashion in opposition to said flat support member, said curing member being so positioned lengthwise of said conveyor that, when said curing chamber is moved into engagement with the conveyor belt at a time between steps of movement of the conveyor belt, said end walls will enter the respective spaces between adjacent pairs of mould parts and a plurality of mould parts will be enclosed in said curing chamber;

power means for moving said curing chamber between said two positions; and means for introducing a curing gas under pressure into said curing chamber when said side walls and end walls engage said curing chamber.

8. The combination defined in claim 7 and further comprising releasable lock-down means operatively arranged to lock said curing chamber against the combination of the conveyor belt and said support member.

9. The combination defined in claim 7 and further comprising means for evacuating said curing chamber, and the mould parts enclosed therein, prior to introduction of the curing gas.

10. The combination defined in claim 7, wherein said bed severing device comprises four flat severing plates arranged to define a hollow rectangle of such size and shape as to surround said pattern carrier, one end wall of said curing chamber serving as one of said severing plates.

* * * * *